United States Patent
Long (10) Patent No.: US 9,361,324 B2
(45) Date of Patent: Jun. 7, 2016

(54) SYSTEM AND METHOD TO TRANSFORM A COMPLEX DATABASE INTO A SIMPLE, FASTER, AND EQUIVALENT DATABASE

(71) Applicant: SageTea Inc., Ontario (CA)

(72) Inventor: David Alexander Harry Long, Ontario (CA)

(73) Assignee: SageTea Inc., Ottawa, Ontario (CA)

( * ) Notice: Subject to any disclaimer, the term of this patent is extended or adjusted under 35 U.S.C. 154(b) by 198 days.

(21) Appl. No.: 14/066,929

(22) Filed: Oct. 30, 2013

(65) Prior Publication Data

US 2014/0129514 A1 May 8, 2014

(30) Foreign Application Priority Data

Nov. 6, 2012 (CA) .................................. 2794317
Feb. 20, 2013 (CA) .................................. 2806715

(51) Int. Cl.
*G06F 17/30* (2006.01)

(52) U.S. Cl.
CPC ............................... *G06F 17/30292* (2013.01)

(58) Field of Classification Search
CPC ............ G06F 17/30292; G06F 17/30; G06F 17/30563; G06F 17/30575; G06F 17/30569; G06F 17/30289; G06F 17/30554; G06F 9/466; G06F 17/303; G06F 11/79; G06F 17/30297; G06F 17/30356; G06F 17/30359; G06F 17/30386; G06F 17/30424
USPC .......................... 707/741, 711, 803, 667, 609
See application file for complete search history.

(56) References Cited

U.S. PATENT DOCUMENTS

| | | | | |
|---|---|---|---|---|
| 5,596,746 A | * | 1/1997 | Shen | G06F 17/30595 707/E17.032 |
| 5,604,863 A | * | 2/1997 | Allen | G06F 11/1417 714/11 |
| 5,918,225 A | * | 6/1999 | White | G06F 17/30324 707/E17.058 |
| 6,263,328 B1 | * | 7/2001 | Coden | G06F 17/30398 707/E17.005 |
| 6,279,008 B1 | * | 8/2001 | Tung Ng et al. | 707/758 |
| 6,341,277 B1 | * | 1/2002 | Coden | G06F 17/30451 707/718 |
| 6,353,820 B1 | * | 3/2002 | Edwards | G06F 17/30336 707/696 |
| 6,374,256 B1 | * | 4/2002 | Ng et al. | 707/741 |
| 7,013,315 B1 | * | 3/2006 | Boothby | G06F 17/30575 707/E17.032 |
| 7,526,471 B2 | * | 4/2009 | Dettinger et al. | 707/738 |
| 7,703,021 B1 | * | 4/2010 | Flam | 715/741 |
| RE43,571 E | * | 8/2012 | Boothby | G06F 17/30578 707/635 |
| 8,626,778 B2 | * | 1/2014 | Wilkes et al. | 707/756 |
| 8,635,251 B1 | * | 1/2014 | Chan | 707/803 |
| 2002/0169788 A1 | * | 11/2002 | Lee et al. | 707/104.1 |

(Continued)

OTHER PUBLICATIONS

Cong Yu, and H. V. Jagadish—"Querying complex structured databases"—Proceeding VLDB '07 Proceedings of the 33rd international conference on Very large data bases—VLDB '07, Sep. 23-28, 2007, Vienna, Austria.—pp. 1010-1021.*

(Continued)

*Primary Examiner* — Anh Ly
(74) *Attorney, Agent, or Firm* — Adam K. Sacharoff; Much Shelist (57) ABSTRACT

There is provided a system and method for representing complex databases having an arbitrary number of tables with a simple database comprising at least two tables, in which each attribute of each object is represented in a first table and in which each object is represented as a list of attributes in a second table. There is also provided a method for converting a complex database in a simple database.

8 Claims, 5 Drawing Sheets

(56) References Cited

U.S. PATENT DOCUMENTS

| | | | |
|---|---|---|---|
| 2006/0190355 A1* | 8/2006 | Jammes et al. | 705/27 |
| 2007/0073759 A1* | 3/2007 | El-Sabbagh | 707/102 |
| 2008/0046462 A1* | 2/2008 | Kaufman et al. | 707/102 |
| 2009/0031006 A1* | 1/2009 | Johnson | H04W 4/025 709/218 |
| 2009/0044090 A1* | 2/2009 | Gur et al. | 715/212 |
| 2009/0044091 A1* | 2/2009 | Gur et al. | 715/212 |
| 2011/0035205 A1* | 2/2011 | Brideson et al. | 703/22 |
| 2011/0302151 A1* | 12/2011 | Abadi et al. | 707/714 |
| 2012/0023116 A1* | 1/2012 | Wilkes et al. | 707/756 |
| 2013/0346274 A1* | 12/2013 | Ferdinand et al. | 705/37 |

OTHER PUBLICATIONS

Chan et al.—"Independence-reducible database schemes"—Published in: Journal Journal of the ACM (JACM) JACM Homepage archive , vol. 38 Issue 4, Oct. 1991—pp. 854-886 ACM New York, NY, USA—lwrnd Clfthe .4\wc1dtlm for Cc]mputkngMwh,new, Vd 3S, No. 4. Oct. 1991, pp. 854-886.*

* cited by examiner

SYSTEM AND METHOD TO TRANSFORM A COMPLEX DATABASE INTO A SIMPLE, FASTER, AND EQUIVALENT DATABASE

FIELD OF THE INVENTION

The present disclosure relates to databases. In particular, the present disclosure relates to a method for transforming a complex database in a simpler, faster database, without losing information from the complex database.

BACKGROUND

Modern database systems contain a large number of individual database tables. As the size and complexity of modern software systems grow, so does the need to store and maintain larger and larger sets of data. Database systems that contain hundreds to thousands of database tables are not uncommon. Furthermore, the relationships between each of these tables can be multiple to multiple, creating a complex web of logic that often becomes cumbersome and difficult to maintain.

With respect to maintenance costs, the requirements to change the structure of complex database systems often occurs annually or sooner for large companies. This effort requires the labor of database administrators and programmers, all of which create significant labor cost.

Thus, it is desirable to develop a system and method for the automatic translation of software system requirements from their source directly into a self-maintaining system—capable of changing its structure in order to represent any database schema and data dynamically.

Such automation further reduces errors due to human factors or logical inconsistencies.

The present disclosure overcomes these deficiencies of the prior art as set out below.

SUMMARY

According to one aspect, there is provided a method for transforming a database comprising a plurality of tables into a simple database, comprising providing a first table, said first table having an index column, a name column, a value column; providing a second table, said second table having an index column and an elements column; creating a second table entry in the second table for each row of each table of the database; for each table of the plurality of tables, determining which cells include references to other tables in the plurality of tables; for each cell of each table of the database which does not include a reference to other tables in the plurality of tables: creating a first table entry in the first table, wherein the name column includes a column heading of the cell, the value column includes a value of the cell, the first table entry having an index; and updating the second table entry to include the index of the first table entry; for each cell of each table of the database which does include a reference to other tables in the plurality of tables: determining a reference entry in the second table, the reference entry corresponding to the reference; creating a first table entry in the first table, wherein the name column includes a column heading of the cell, the value column includes the index of the reference entry, the first table entry having an index; and updating the second table entry to include the index of the first table entry.

According to another aspect, there is provided a computer readable medium having stored thereon a database, the database comprising: a first table having an index column, a value column, and an attribute column; a second table having an index column and an elements column; wherein each row of the second table defines an object, the object corresponding to the set of entries in the first table referenced in the elements column.

BRIEF DESCRIPTION OF THE DRAWINGS

The present application will be better understood with reference to the drawings, in which.

DETAILED DESCRIPTION

The present disclosure provides for a method and system for transforming a complex database in a simpler and faster database, as described in detail below.

For the purposes of the present disclosure, the term "input database" will be used to denote the complex database before transformation. The term "input table" will be used to denote tables of the input database.

The system and method of the present disclosure are applicable to any arbitrary input database, regardless of the number of tables or their relationship to each other. All information, including relational information, is preserved during transformation.

However, the output database does not include an arbitrary number of tables. Rather, the output database includes an Element table and a Group table. In some embodiments, the output database further includes a Group-Link table, and a Binary-Elements table. Each of these are described in detail below.

An element represents the simplest data item of the present system. In particular, each element of the Element table corresponds to a single value from an object in the input database.

For example, let us consider an input database comprising a table describing airline flights, shown below as Table 1. Each row of Table 1 corresponds to a flight object, and each flight object is described by a flight number, a city of departure, a city of arrival, and a date.

TABLE 1

| Flight No. | Departure | Arrival | Date |
|---|---|---|---|
| 213 | Ottawa | Montreal | Oct. 17, 2012 |
| 451 | Toronto | Vancouver | Oct. 18, 2012 |
| 127 | Winnipeg | Calgary | Oct. 19, 2012 |
| 632 | Halifax | Edmonton | Oct. 20, 2012 |

As can be seen from the corresponding Element table, each cell in Table 1 corresponds to a row of the Element table.

Element Table 1

| identity | name | value | group_identity |
|---|---|---|---|
| 1 | Flight No. | 213 | 00001 |
| 2 | Flight No. | 451 | 00002 |
| 3 | Flight No. | 127 | 00003 |
| 4 | Flight No. | 632 | 00004 |
| 5 | Departure | Ottawa | 00001 |
| 6 | Departure | Toronto | 00002 |
| 7 | Departure | Winnipeg | 00003 |
| 8 | Departure | Halifax | 00004 |
| 9 | Arrival | Montreal | 00001 |
| 10 | Arrival | Vancouver | 00002 |
| 11 | Arrival | Calgary | 00003 |
| 12 | Arrival | Edmonton | 00004 |
| 13 | Date | Oct. 17, 2012 | 00001 |
| 14 | Date | Oct. 18, 2012 | 00002 |
| 15 | Date | Oct. 19, 2012 | 00003 |
| 16 | Date | Oct. 20, 2012 | 00004 |

As seen from the above, the Element table includes 4 columns, namely identity, name, value and group_identity. The identity is an index used to reference any element from the Element table. The name identifies the column in the input table from which the value originates. The value includes the value of the element as it appears in the input table, and the group_identity identifies the object to which the value belongs in the input table, as is described below.

A group corresponds to an object in the input database and comprises each of the elements derived from that object. An exemplary Group table corresponding to Table 1 is shown below.

Group Table 1

| group identity | Elements |
|---|---|
| 00001 | (1, 5, 9, 13) |
| 00002 | (2, 6, 10, 14) |
| 00003 | (3, 7, 11, 15) |
| 00004 | (4, 8, 12, 16) |

As seen above, each group comprises a group_identity, as an index to address any group within the Group table. Moreover, the Group table comprises a list of elements, identified by their respective identity, or index.

Notably, it can be shown that Table 1 can be reconstructed from the Element and the Group table above. Accordingly, no information was lost in the transformation.

Specifically, by starting with group 1, one finds elements 1, 5, 9 and 13. Going to the Element table, one finds that element 1 corresponds to Flight No. 213, element 5 corresponds to Departure from Ottawa, element 9 corresponds to Arrival in Montreal, and element 13 corresponds to a date of Oct. 17, 2012. Therefore, group 1 correctly reconstructs the first row of Table 1. A similar process can be used to reconstruct the subsequent rows of Table 1, based on groups 2, 3 and 4.

Groups can also be elements. This is useful, as in many existing databases, the attribute of an object may not have a discrete value, but rather have an object as a value.

In particular, considering the above example, let us consider that the input database further includes a customer table, as shown below.

TABLE 2

| Customer Number | Name | Flight No. |
|---|---|---|
| 101 | John Doe | 451 |
| 102 | Bill Smith | 213 |
| 103 | Emma Jones | 632 |

As with Table 1 above, Table 2 may be transformed in groups and elements. However, during transformation there is no need to create individual group and element tables for each input table. Rather, new groups and elements are simply appended on the existing Group table and Element table.

As will be appreciated by those skilled in the art, Table 2 includes a "Flight No." column, which corresponds to the "Flight No." column in Table 1. In this particular case, "Flight No." functions as a key for Table 1, as each Flight No. uniquely identifies a single flight (for the purposes of this example), and may be used by other tables to reference a flight object.

Because "Flight No." is a key for Table 1, when an element with name "Flight No." is encountered in a separate table, the element's value will not be the discrete value, but rather the group corresponding to the flight object having a Flight No. of the discrete value. This is illustrated in the Element table below.

Element Table 2

| identity | name | value | group_identity |
|---|---|---|---|
| 17 | Customer Number | 101 | 00005 |
| 18 | Customer Number | 102 | 00006 |
| 19 | Customer Number | 103 | 00007 |
| 20 | Name | John Doe | 00005 |
| 21 | Name | Bill Smith | 00006 |
| 22 | Name | Emma Jones | 00007 |
| 23 | Flight | group_identity: 00002 | 00005 |
| 24 | Flight | group_identity: 00001 | 00006 |
| 25 | Flight | group_identity: 00004 | 00007 |

Notably, the value for elements 23, 24 and 25 are group identifiers. These groups are identified based on a method discussed below with respect to FIG. 5.

Table 2 further adds to the Group table, as shown below.

Group Table 2

| group_identity | Elements |
|---|---|
| 00005 | (17, 20, 23) |
| 00006 | (18, 21, 24) |
| 00007 | (19, 22, 25) |

From the Group table, we see that the group with group_identity 00005 includes elements 17, 20, and 23. To resolve this group, we first look at the Elements table at element 17 and find Customer Number 101. Then we look at the Elements table at element 20 and find the Name "John Doe". Then we look at the Elements table at element 23 and find the Flight group_identity:00002.

Because the last element of group_identity 00005 is also a group, it must be resolved in a similar manner. Thus, we look at the Group table and find that group_identity:00002 includes elements 2, 6, 10 and 14. By a look-up in the Element table, we see that these elements correspond to Flight No. 451, whose Origin is Toronto and whose Destination is Vancouver on the date of Oct. 18, 2012.

Thus, we know that John Doe, Customer Number 101 will be a passenger on Flight No. 451 from Toronto to Vancouver on Oct. 18, 2012.

As seen above, groups can be elements, and can be a member of another group. For example, element 23 is a group, and is itself the member of a group. According to the present nomenclature, element 23 is a sub-group, because it is a group which is part of a group.

The present Group and Element tables contain all the information necessary to determine who is/are the parent/children of a particular group. For example, based on the entry in the column group_identity for element 23, we see that the parent group is group 5. Moreover, based on the entry in the value column for element 23, we see that element 23 corresponds to group_identity:00002. Going into the Groups table, we see that group_identity:00002, namely element 23, includes the elements 2, 6, 10, and 14. Going back to the Elements table we see that none of elements 2, 6, 10 and 14 are sub-groups.

However, it is useful to be able to provide the parent/children of a particular group without having to resolve the elements through the Group and Element table as shown above. Therefore, according to at least some embodiments, the system includes a Group-Link table, which includes the parent/children relationships between the groups. A Group-Link table based on the above example is provided below.

Group Link Table 1

| parent_identity | children_identity |
|---|---|
| 00001 | ( ) |
| 00002 | ( ) |
| 00003 | ( ) |
| 00004 | ( ) |
| 00005 | (group_identity: 00002) |
| 00006 | (group_identity: 00001) |
| 00007 | (group_identity: 00004) |

As seen in the above Group-Link table, groups 00001 to 00004 have no children, and groups 00005 to 00007 have 1 child each. However, in a more complex example, one would expect to have groups with multiple children.

In a further embodiment, the Group-Link table may include a link to a group's parents as well, as shown with reference to Group Link Table 2 below.

Group Link Table 2

| group_identity | children_identity | parent_identity |
|---|---|---|
| 00001 | ( ) | (group_identity: 00006) |
| 00002 | ( ) | (group_identity: 00005) |
| 00003 | ( ) | ( ) |
| 00004 | ( ) | (group_identity: 00007) |
| 00005 | (group_identity: 00002) | ( ) |
| 00006 | (group_identity: 00001) | ( ) |
| 00007 | (group_identity: 00004) | ( ) |

Notably, a group may have multiple parents as well, even if in the above example only shows groups having a single parent.

In some cases, elements are not related to data which can be represented as text. For example, one element could relate to an image, such as the photo of an individual. These elements are stored in the Element-Binary table, which is designed to hold Binary Large Objects (BLOBs), and referenced in the Elements table.

Further to the airline example above, let us consider a table of pilots from an airline, in which the photo of the pilots is included as a column in the table.

TABLE 3

| Pilot_Id | Name | Airline | Photo |
|---|---|---|---|
| 12345 | Frodo Baggins | Middle Air |  |

As in the above example, the items in the Pilot_Id, Name, and Airline columns are provided as elements in the Element table. Notably however, the item in the Photo column is provided in the Element table, but the value of this element will be a reference to the Element-Binary table, which will include the relevant image.

Element Table 3 below is a continuation of the Element table based on Table 3.

Element Table 3

| identity | name | value | group_identity |
|---|---|---|---|
| 26 | Pilot_Id | 12345 | 00008 |
| 27 | Name | Frodo Baggins | 00008 |
| 28 | Airline | Middle Air | 00008 |
| 29 | Photo | element-binary: 00001 | 00008 |

The above would further imply additions to the Groups table, but these are omitted for the purposes of the present disclosure. An Element-Binary table based on the above is shown below.

Element-Binary Table 1

| index | data |
|---|---|
| 00001 |  |

The Element-Binary table simply includes an index, and the relevant BLOB in the data column.

The above has demonstrated that an input database with an arbitrary number of tables can be converted into an Element Table and a Group Table. Furthermore, in some embodiments, the Element Table and Group Table are supplemented with a Group-Link table, and/or, an Element-Binary table.

This section will examine the algorithm complexity of resolving objects using the Element Table and the Group Table. Specifically, it will be demonstrated that any object may be viewed as a binary tree, and that resolving an object consists of performing a tree traversal.

Let C be the set of all databases. Let C' subset of C be the set of all structured query databases, e.g. SQL for relational databases. Let A represent the present method, as described in the present disclosure, and let B represent the set of all other methods for structured queries on the set C'. We will show that for meaningful queries on finite sets, the worst-case performance of A is better than the worst-case performance of B.

A query is order-independent if the ordering of objects in the structure does not affect the results of the query. The present method is constructed for order-independent queries.

Define the class called Elements to be the class constructed of the attributes. Define the class called Groups as a subclass of Elements, and thereby inheriting from Elements. Furthermore, instances of Groups contain instances of Elements. We will assume that the number of objects defined as Groups, m, and the number of objects defined as Elements, n, are both finite. According to the present method, instances of the class Groups are stored in the Group table, and instances of the class Elements are stored in the Element table.

We allow for a group to be one of the elements of another group. Thus, we establish a two directional connection between the Group table and the Element table, one direction from the Group table to the Element table joining an element of each group to its respective group, and the other direction from the Element table to the Group table, allowing for a group to be an element of another group. See FIG. 1 for an example.

Consider a schema S as a labeled directed tree, where the nodes represent groups or elements, and the links represent the relationships between the nodes. We assume that every node is a child of another node, except for the root. Define the ancestors of a node v to be all the nodes along the path from the root to the node v. Define the descendants of a node v to be all nodes v1, ..., vk such that v is their ancestor. The level of a node is defined by letting the root be at level one. If a node is at level I, then all of its children are at level I+1. The depth of a tree is defined as the maximum level of any node in the tree.

Starting from a given group G1, the present method starts from the group G1 in the Group table and finds all of the elements E1, ..., Ek linked to G1. If there are no groups among E1, ..., Ek, the program returns this set as the output.

Otherwise, if there exists an element Ei such that Ei=Gj, the algorithm goes along the path (link) from node Ei to node Gj. Subsequently, the algorithm finds all nodes that are linked to Gj, and this continues until all of the nodes that are linked in this manner are found. We assume that throughout this algorithm, if an object has been retrieved once, it will not be retrieved again. That is, if Gi, for some i, has already been retrieved as one of the elements of a node in previous steps, it will not be retrieved again as one of the elements of another node, even if it belongs to this second set of elements. This assumption eliminates any possibility of the algorithm to not terminate.

For the purpose of algorithmic analysis, we use the tree representation as defined above. We start by constructing the rooted tree generated from the query Q made by the user. Next, node G1 corresponding to Q is visited. Afterwards, all descendants of G1 get visited. The output of the algorithm is the subtree rooted at G1. This can be achieved by using any of the common methods for tree traversal. Note that a subtree rooted at a vertex v, is itself another rooted tree. For example, consider Inorder traversal. Inorder traversal consists of moving down the tree towards the left until you cannot go any further. Then, visit the node, and move one node to the right and continue in the recursive manner. Note that Inorder traversal can be represented in a non-recursive manner. For a tree of n nodes, it can be shown that the space required for non-recursive inorder traversal is at most n and the time complexity is of O(n), as described in Fundamentals of Data Structure in C++, Computer Science Press, New York, 1995, by Horowitz, Sahni and Mehta.

Note that it is sufficient to construct the model using binary trees. This claim is supported by the fact that any k-ary tree can be transformed into a binary tree, using the method known as "Left Child-Right Sibling Representation", as described below.

Consider a binary tree T. The maximum number of nodes at each level i is $2^{i-1}$ for i greater than or equal to 1. Thus, the maximum number of nodes in a binary tree of depth k is $2^k-1$. It can be shown that the height of a complete binary tree with n nodes is $[\log_2(n+1)]$.

Standard complexity analysis includes measuring how run time grows as a function of input size. Note that for a database, this means we will use Boolean (yes/no) queries to eliminate dependence on output size, and the input size is equal to database size plus query size.

We use conjunctive queries which are the most common SQL queries (Select-Project-Join). It has been shown, in Chandra, A. K., Merlin, P. M., Optimal Implementation of Conjunctive Queries in Relational Data Bases, Proceedings of the ninth annual ACM symposium on Theory of computing, 1977, that the combined complexity of conjunctive queries is NP-complete.

Evaluation of large conjunctive queries is a difficult problem for databases. This is mainly due to the fact that the database is required to evaluate a long sequence of joins and projections. Thus, the query optimizer has to search a very large space and continuously move from one table to another, which may result in a great amount of time/space to finish the query.

Using the present method, the need for constructing several tables is eliminated through an efficient construction of only two tables, namely the Group table and the Element table. As discussed above, all queries can be found by moving along these two tables, which can also be viewed as a tree traversal. Tree traversal can be accomplished in O(n) which is a great reduction from the typical time and space required by methods using multiple tables.

Figure 1:
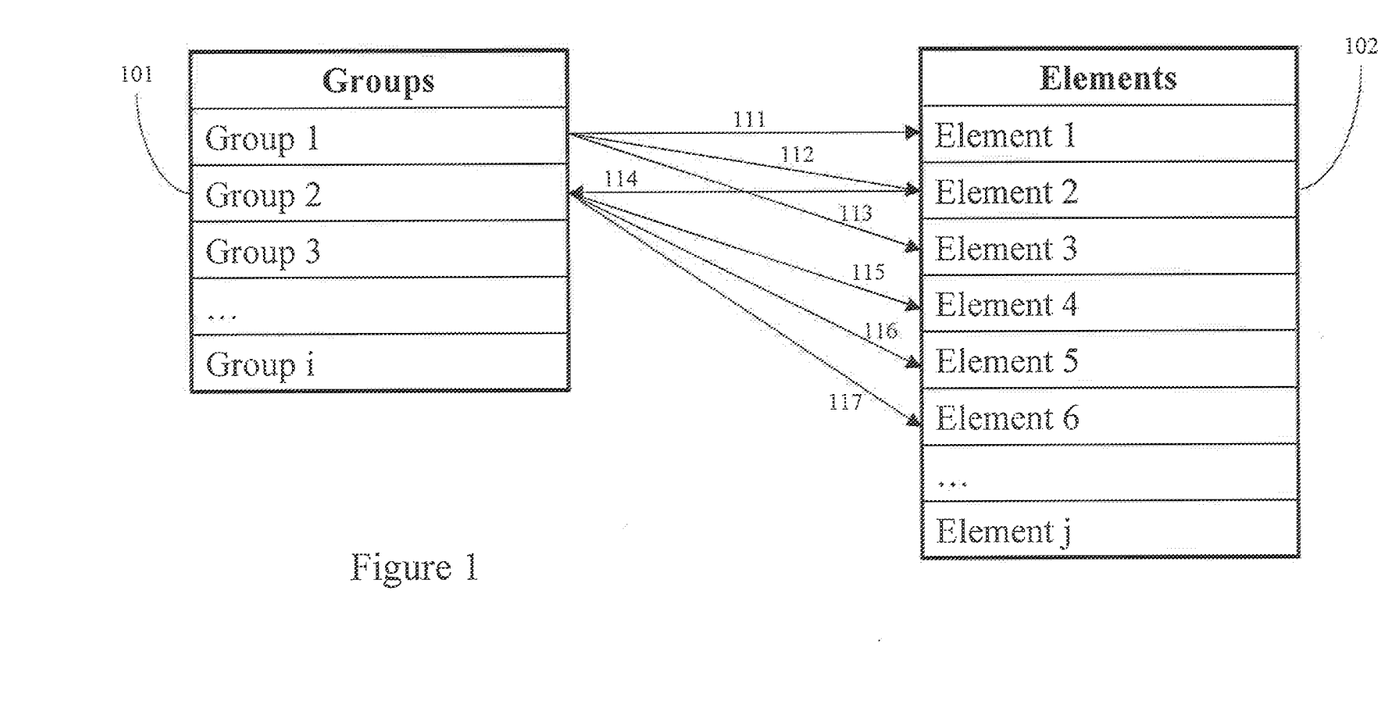
FIG. 1 is a block diagram representing the logical relationship between groups and elements according to at least one embodiment of the present disclosure.

Reference is made to FIG. 1, which includes a Group table 101 and an Element table 102. Groups table 101 lists groups 1 to i, and Elements table 102 lists elements 1 to j.

As represented by arrows 111, 112 and 113, group 1 includes elements 1, 2 and 3. Further, as represented by arrow 114, element 2 is group 2. Similarly, as represented by arrows 115, 116 and 117, group 2 includes elements 4, 5 and 6.

As would be appreciated by those skilled in the art, FIG. 1 describes a k-ary tree, in which groups 1 and 2, and elements 1 to 6 are the nodes, and in which the arrows are the branches.

More specifically, the method for resolving a given group G is described with reference to FIG. 2.

The method starts at 200, and proceeds to block 210 in which the elements of group G are retrieved. At block 220, the method iterates over every element of group G. If an element is not a group, the value of the element is retrieved. If an element is a group, the method proceeds back to block 210 in which the elements of that group are retrieved.

Figure 2:
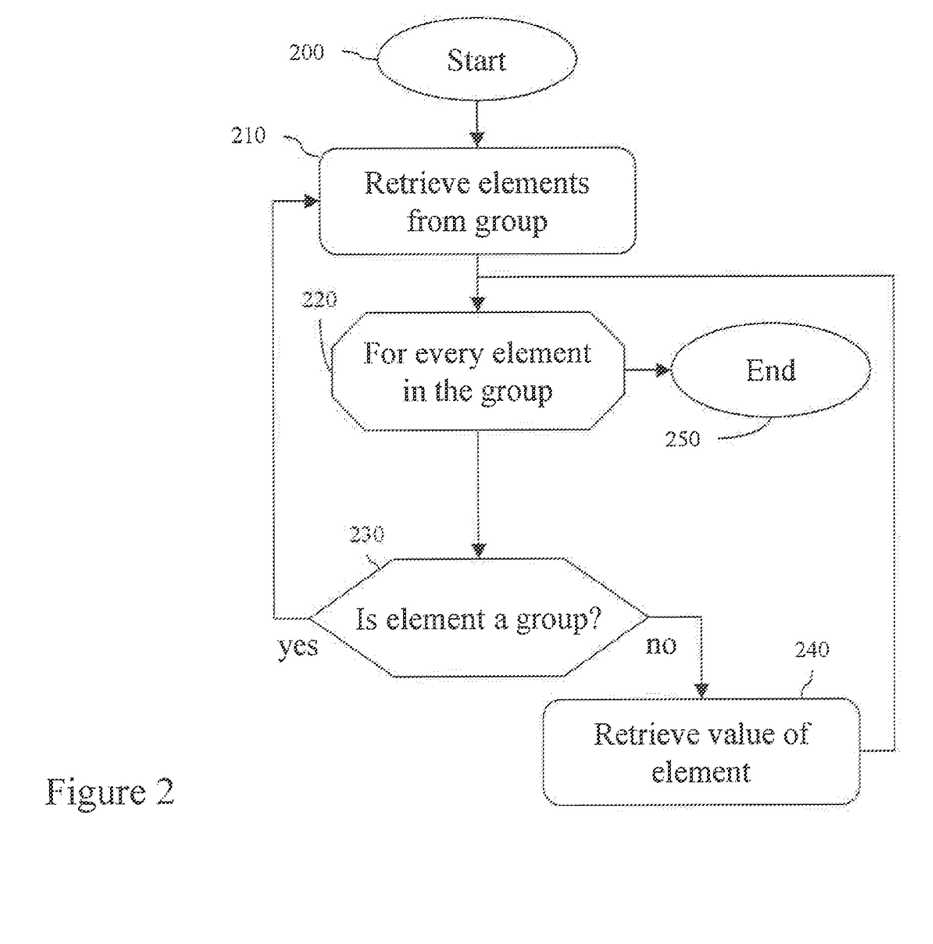
FIG. 2 is a block diagram of a method for resolving a group according to at least one embodiment of the present disclosure.

Accordingly, a group may be resolved recursively based on the method shown in FIG. 2. Notably, if a group includes elements which also include the parent group, the method of FIG. 2 will run indefinitely. Accordingly, when an element is retrieved, a check is made to ensure that the element was not already retrieved previously, thereby preventing endless loops.

According to at least one embodiment, instead of a k-ary tree as shown in FIG. 1, a binary tree is constructed from the Groups and Elements tables. In particular, any k-ary tree can be transformed into a binary tree using "Left Child-Right Sibling Representation", as is known in the art and described in Fundamentals of Data Structure in C++, Computer Science Press, New York, 1995, by Horowitz, Sahni and Mehta.

Figure 3:
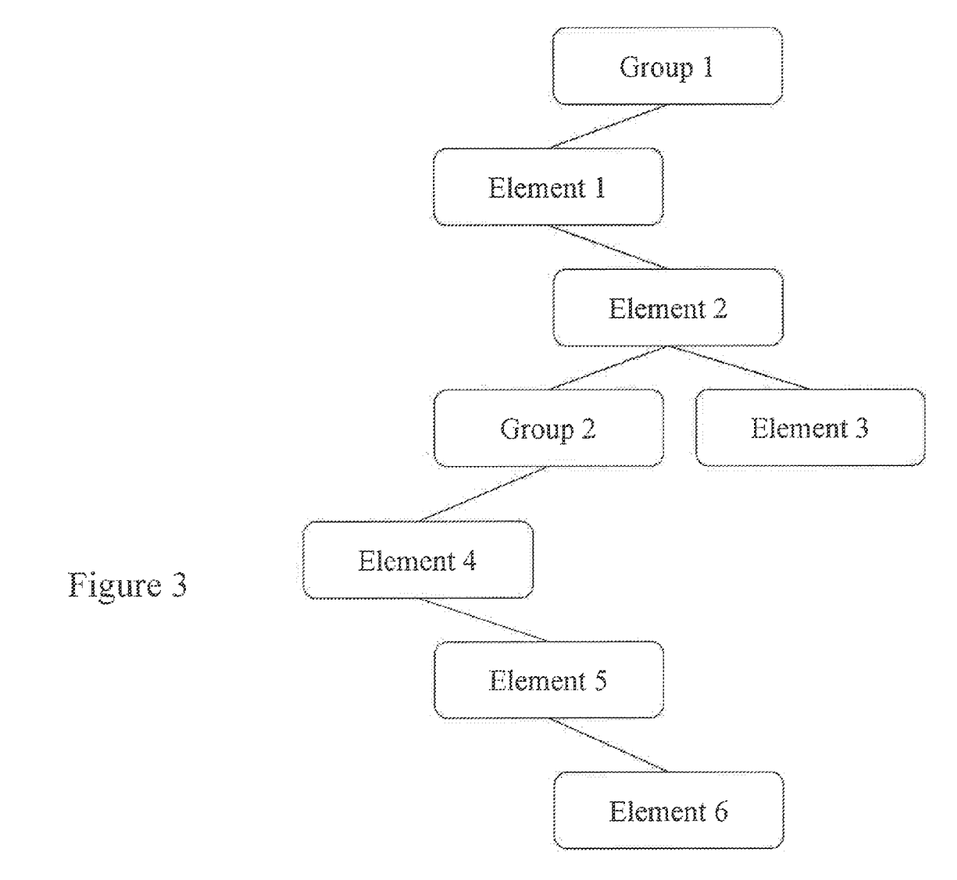
FIG. 3 is a binary tree representation of a group according to at least one embodiment of the present disclosure.

FIG. 3 shows a binary tree constructed using Left Child-Right Sibling Representation from the k-ary tree of FIG. 1.

In a binary tree constructed using Left Child-Right Sibling Representation, the left child of a node in a binary tree corresponds to the leftmost child (if any) of that same node in the k-ary tree, and the right child of a node in a binary tree corresponds to the closest right sibling (if any) of that same node in the k-ary tree.

The method for converting an arbitrary database into a simple database will now be described from a general perspective. The input database contains n tables. Each table includes a key value, which uniquely identifies each element within the table.

In at least some embodiments, the input database is provided with a list of key values. In at least another embodiment, the key value of a table is provided in the first column of the table. However, other means of identifying the key value of a table are known and the present disclosure is not so limited.

Notably, while the key value of a table is known, in most cases it will not be apparent under what heading the key values appear in a different table. For example, as seen above, the key value of Table 1 is "Flight No.", and this value is referenced in a subsequent table under the heading "Flight No.". In this case, the headings are the same, however this is not necessarily the case. In order to ensure that the proper linkage is created between "Flight No." in Table 1 and "Flight No." in Table 2, an analyst or a programmer may be required to manually provide the linkage information to the system. As such, when a table references a key value from another table, it is known by the transformation process.

Figure 4:
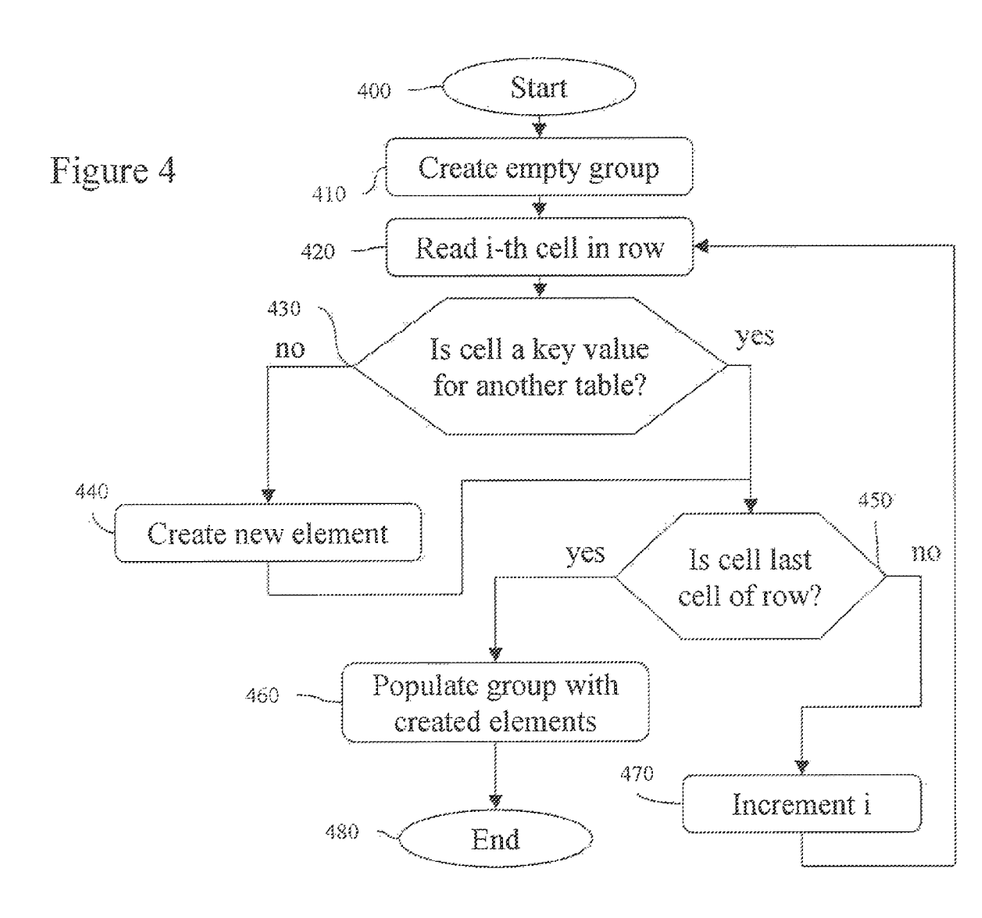
FIG. 4 is a block diagram of a method for transforming a database according to at least one embodiment of the present disclosure.

Reference is now made to FIG. 4 which shows a block diagram of the first stage of the transformation process.

A first table is selected from the input database. For each object or row in the table, the process of FIG. 4 is performed.

The process starts at 400 and proceeds to block 410 in which a group is created in the Group table, but the "Elements" column in the group table is not populated.

At block 420, the i-th cell in the row is read. If the value of the element is not a group, that is, if the column of the current cell is not linked to a key value from another table, the process proceeds to block 440 in which an element is created with a unique identity, a name corresponding to the column heading, the value of the cell, and the group identity based on the group created for the object or row. If the value is a binary object, an entry is created in the Element-Binary table and the value stored in the Element table is a reference to this entry.

If the value of the element is a group, that is, if the column of the current cell is linked to a key value from another table, no element is created at this stage.

At block 450, a check is made to see if the current cell is the last cell in the row. If not, i is incremented at block 470 and the process goes back to block 420 to read the next cell in the row.

If all cells in the row were processed, the group is updated with the index values of the newly created elements at block 460, and the process ends at block 480.

This is repeated for each table in the input database.

At this stage, conversion of the database is complete except for the missing values for elements which correspond to groups. These are filled-in with a process described in FIG. 5.

Notably, in order to fill-in the missing values, the process will iterate through the tables of the input database a second time. As it does so, it should be able to keep track of which elements and which groups created in the first stage correspond to any given object or cell of a table from the input database. This can be accomplished by various means.

For example, in one embodiment the iteration through each table of the input database could be performed in the exact same order as during the first stage of the process. As groups and elements are added to the Group and Element tables in sequence, this would allow the process to associate objects or cells of the input table with groups or elements.

In another embodiment, group and element information are added to the input database, without otherwise modifying the input database, so that as the process iterates through its tables a second time, corresponding group and element information is available to the process.

In yet another embodiment, information linking objects and cells of the input database with groups and elements is stored in a separate data structure which may be queried by the process.

Other means of ensuring that this information is available during the second stage of the process would be apparent to those skilled in the art, and the present disclosure is not so limited.

Figure 5:
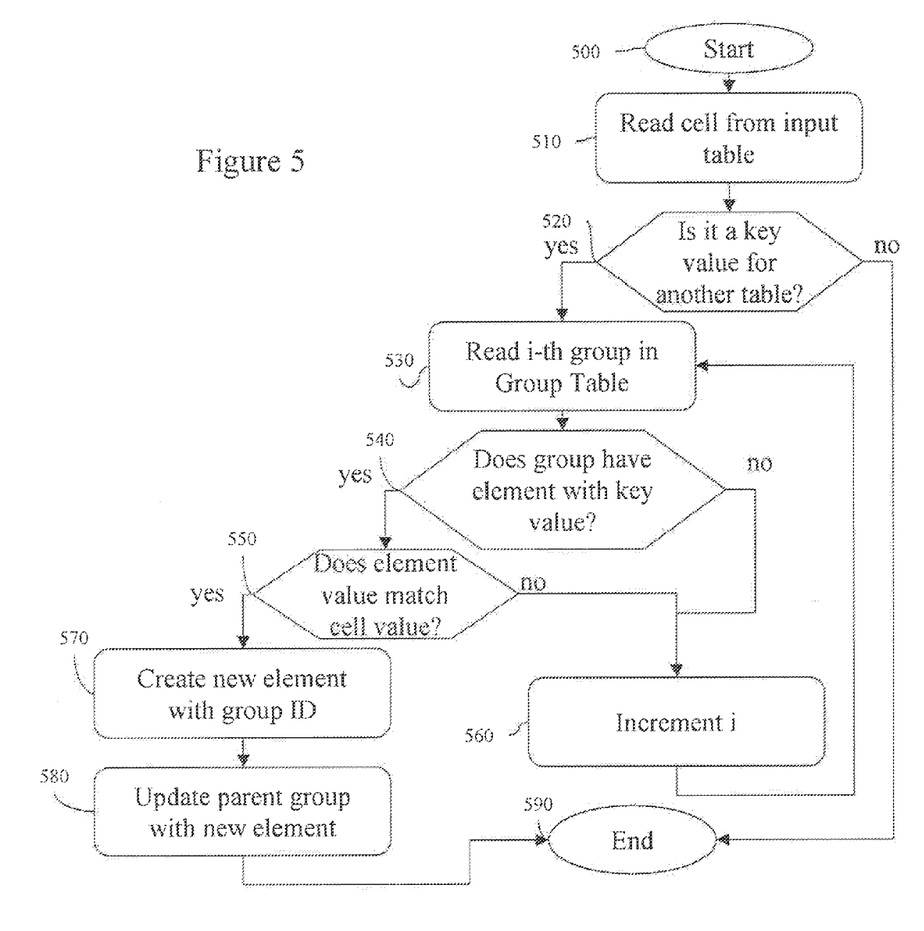
FIG. 5 is a block diagram of a method for transforming a database according to at least one embodiment of the present disclosure.

The second stage of the conversion process is illustrated in FIG. 5 and is performed for every cell of the input database. The process starts at block 500 and proceeds to block 510 in which a cell is read from the input table. At block 520 it is determined whether the cell includes a key value from another table. If not, the cell has already been transformed in the first stage, and the process ends at block 590.

If the cell includes a key value from another table, a new element pointing to the correct group is created, and the parent group of this element is updated to reflect the creation of this new element. The parent group is known from the association between groups and objects created during the first stage of the transformation. The group to which the new element should point to is identified by a search.

At block 530, the i-th group is read from the Group table. If this group does not include an element with the key value, i is incremented at block 560 and the process returns to block 530 to read the next group from the Group table.

If the group does include an element with the key value, the value of the cell and the element are compared at block 550. If these values do not match, i is incremented at block 560 and the process returns to block 530 to read the next group from the Group table.

If the values match, the process proceeds to block 570 in which a new element is created whose value is the group identity of the i-th group of the table. As in the first stage, the name of the new element corresponds to the column heading for the current cell, and the group identity of the new element is the parent group.

Then, at block 580, the parent group is updated to reflect the creation of the new element, and the process ends at block 590.

In at least some embodiments, the Group-Link table is created after the creation of the Group table and the Element table. The data in the Group-Link table can be derived easily from the data in the Group Table and the Element table.

The subject matter of the present disclosure may be practiced on any computing device as is known in the art and the present disclosure is not so limited. According to at least one embodiment, the present system and method may be performed on a computing device comprising a processor, random-access memory (RAM), and sufficient storage to store the relevant data.

In at least one embodiment, the present system and method are implemented on a server residing on a network, such as a local area network (LAN) or a wide area network (WAN).

The invention claimed is:

1. A method for transforming a database comprising a plurality of tables into a simple database, comprising:
   providing a first table, said first table having an index column, a name column, a value column;
   providing a second table, said second table having an index column and an elements column;
   creating a second table entry in the second table for each row of each table of the database;
   for each table of the plurality of tables, determining which cells include references to other tables in the plurality of tables;
   for each cell of each table of the database which does not include a reference to other tables in the plurality of tables:
      creating a first table entry in the first table, wherein the name column includes a column heading of the cell, the value column includes a value of the cell, the first table entry having an index; and
      updating the second table entry to include the index of the first table entry; and for each cell of each table of the database which does include a reference to other tables in the plurality of tables:
- determining a reference entry in the second table, the reference entry corresponding to the reference, wherein said determining a reference entry in the second table comprises: finding, in the second table, an entry which includes an index of a key entry in the first table, the key entry in the first table having a name corresponding to the key value and a value corresponding to the value of the cell;
- creating a first table entry in the first table, wherein the name column includes a column heading of the cell, the value column includes the index of the reference entry, the first table entry having an index; and
- updating the second table entry to include the index of the first table entry.

2. The method of claim 1, wherein the first table further includes a group column, and further comprising:
- for each first table entry in the first table, populating the group column with an index of a parent entry in the second table, the parent entry comprising the index of the first table entry.

3. The method of claim 1, wherein said determining which cells include references to other tables in the plurality of tables comprises:
- determining whether the cell corresponds to a key value of another one of said plurality of tables.

4. The method of claim 1, further comprising storing, on a non-transitory computer-readable medium, the first table and the second table.

5. A non-transitory computer readable medium for storing computer readable instructions for causing a processor to perform the method of claim 1.

6. The non-transitory computer readable medium of claim 5, wherein the first table further includes a group column, and further comprising:
- for each first table entry in the first table, populating the group column with an index of a parent entry in the second table, the parent entry comprising the index of the first table entry.

7. The non-transitory computer readable medium of claim 5, wherein said determining which cells include references to other tables in the plurality of tables comprises:
- determining whether the cell corresponds to a key value of another one of said plurality of tables.

8. The non-transitory computer readable medium of claim 5, wherein the method further comprises storing, on a non-transitory computer-readable medium, the first table and the second table.

\* \* \* \* \*